United States Patent [19]

Marzocchi

[11] 3,938,313

[45] Feb. 17, 1976

[54] REINFORCEMENT FOR TIRES AND METHOD OF MAKING SAME

[75] Inventor: Alfred Marzocchi, Cumberland, R.I.

[73] Assignee: Owens-Corning Fiberglas Corporation, Toledo, Ohio

[22] Filed: May 14, 1974

[21] Appl. No.: 469,722

Related U.S. Application Data

[62] Division of Ser. No. 312,003, Dec. 4, 1972, Pat. No. 3,857,229, which is a division of Ser. No. 107,193, Jan. 18, 1971, Pat. No. 3,776,293, which is a division of Ser. No. 664,020, Aug. 29, 1967, Pat. No. 3,631,667.

[52] U.S. Cl. ............... 57/149; 57/140 C; 57/140 G; 57/162
[51] Int. Cl.² ... D02G 3/38; D02G 3/40; D02G 3/48
[58] Field of Search....... 57/140 G, 144, 160, 140 C, 57/140 J, 149, 162; 152/358, 359

[56] References Cited
UNITED STATES PATENTS

| | | | |
|---|---|---|---|
| 3,078,653 | 2/1963 | Marshall | 57/144 X |
| 3,336,743 | 8/1967 | Marshall | 57/144 |
| 3,848,406 | 11/1974 | Tabei et al. | 57/140 G X |

Primary Examiner—Richard C. Queisser
Assistant Examiner—Charles Gorenstein
Attorney, Agent, or Firm—John W. Overman; Paul F. Stutz

[57] ABSTRACT

A reinforcement system for pneumatic tires featuring combination cords of individually varying extensibility composed of elements of extensible character and, combined therewith, elements of relatively inextensible character; the combination cord of greatest extensibility being preselectively located in the region of the tire subjected to the greatest deflection whereby the stress incurred during average environmental usage or of a particular impact is not transferred to the elements of relatively inextensible character until the deflection has reached a value preselectively determined. The combination cords include an organic and a somewhat greater length of substantially inextensible material, e.g., glass, so combined therewith as to yield a unit length, and are tailor-made to exhibit a particular degree of elongation depending upon the particular combination of variable lengths and the selection of organic elements to be combined with the glass.

10 Claims, 17 Drawing Figures

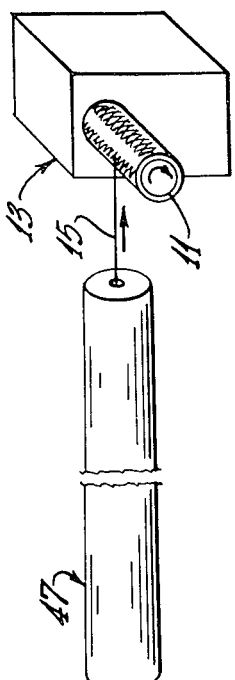
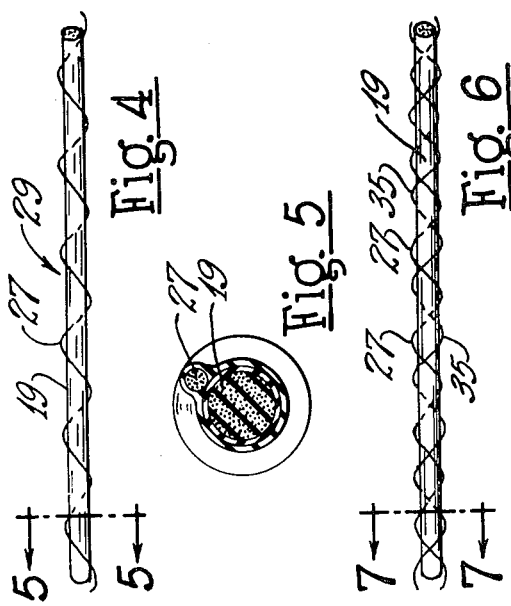
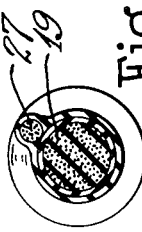
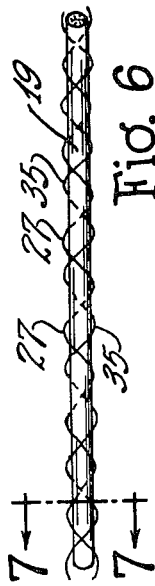
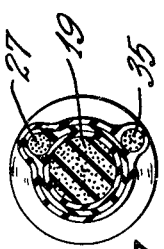
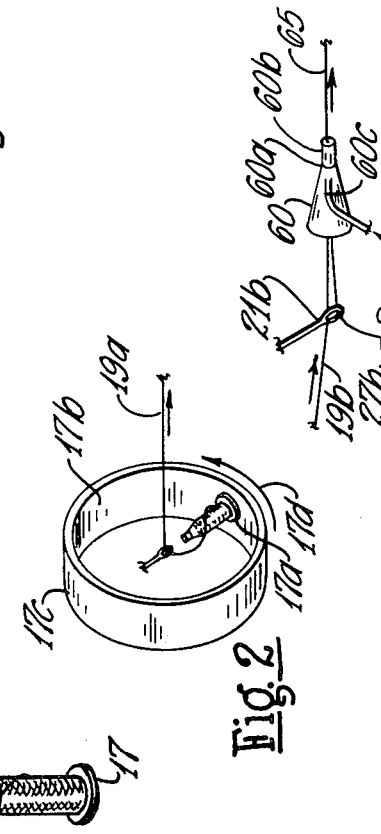
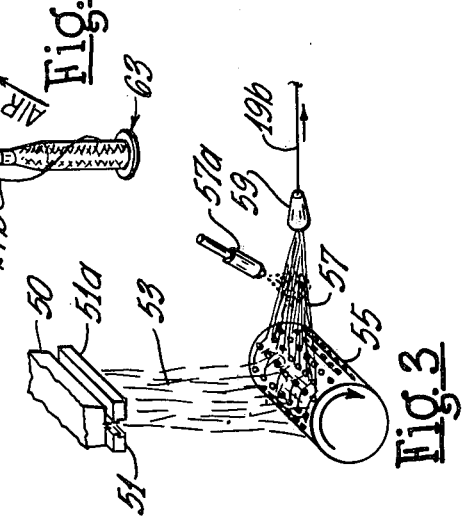

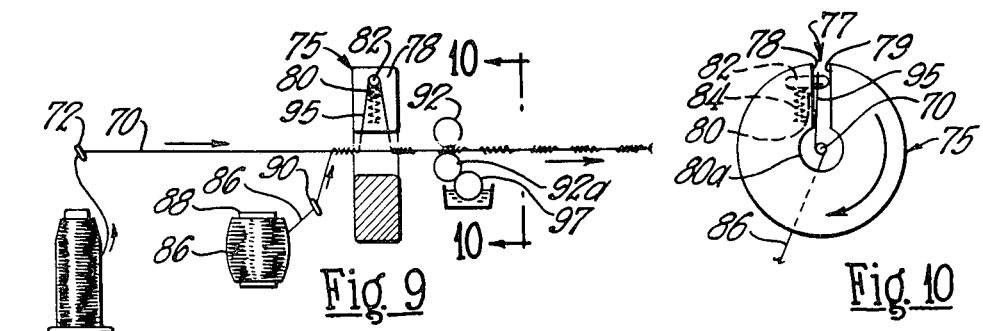
Fig. 9
Fig. 10
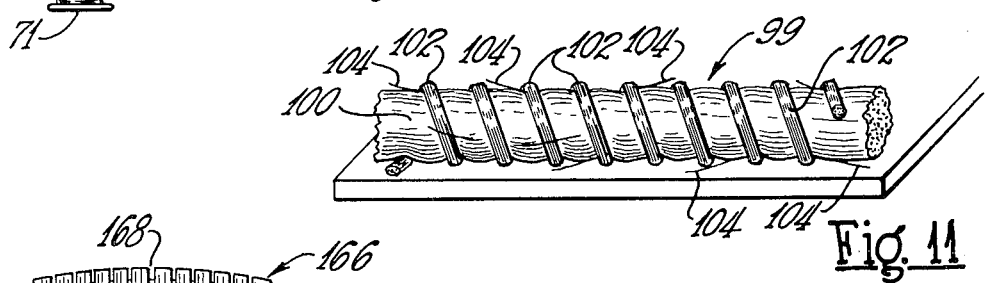
Fig. 11
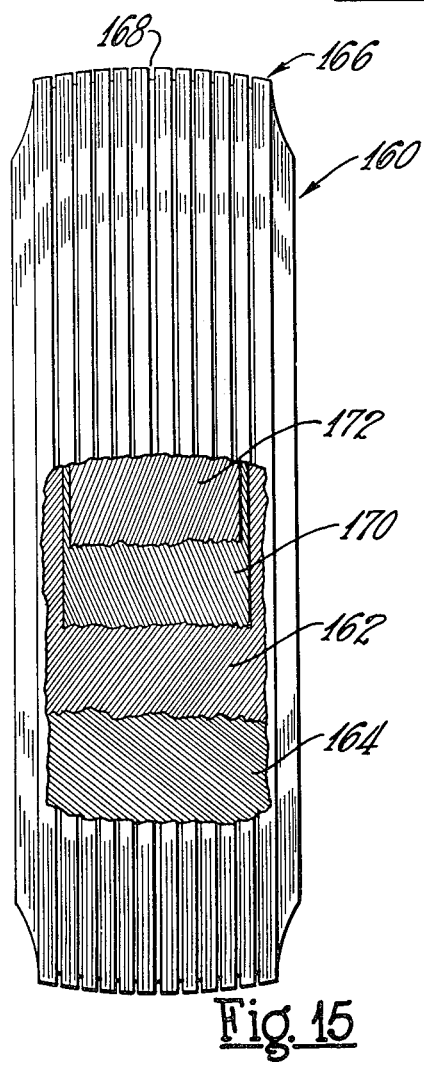
Fig. 15
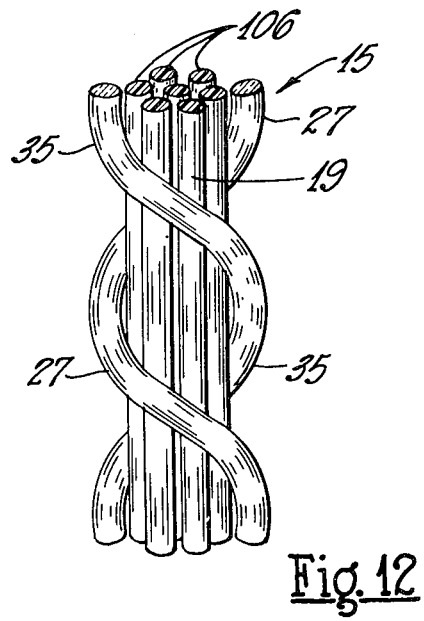
Fig. 12

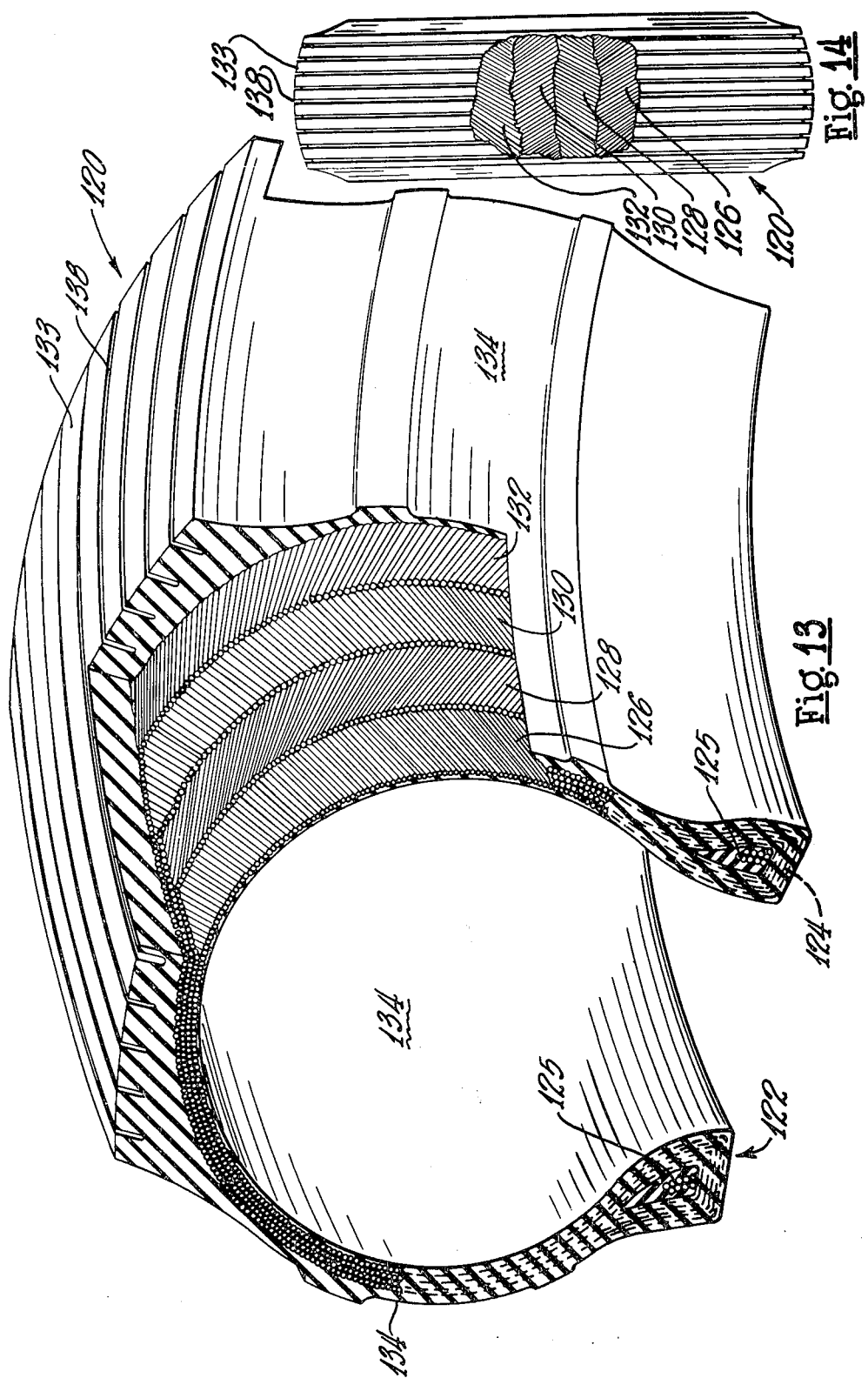

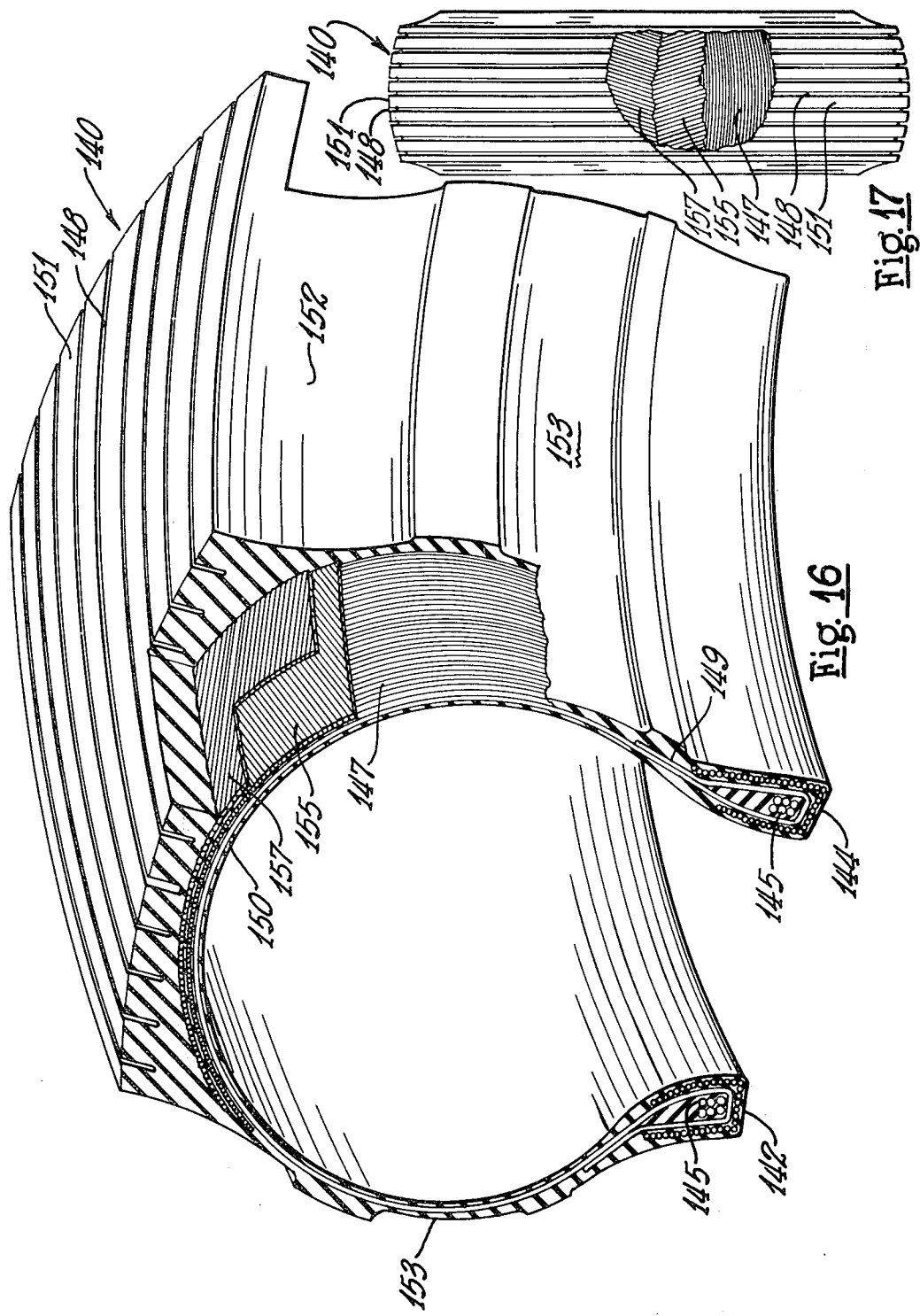

REINFORCEMENT FOR TIRES AND METHOD OF MAKING SAME

This is a division of application Ser. No. 312,003, filed Dec. 4, 1972 now U.S. Pat. No. 3,857,229, issued Dec. 31, 1974, which is a division of application Ser. No. 107,193, filed Jan. 18, 1971, now U.S. Pat. No. 3,776,293, issued Dec. 4, 1973; which application Ser. No. 107,193 is a division of copending application Ser. No. 664,020, filed Aug. 29, 1967, now U.S. Pat. No. 3,631,667, issued Jan. 4, 1972.

It is, of course, well known to employ a variety of natural occurring and synthetic organic cords, yarns and fabric as reinforcement components for pneumatic tires. Cotton, rayon, Nylon, polyester (of which a material sold under the trademark DACRON is a common example) have been employed as well as some of the newer organic materials such as polypropylene and ethylene propylene copolymer. High tensile strength steel wire has also been employed as a reinforcement for radial type pneumatic tires principally in fabricating a belt ply extending circumferentially about the carcass of the tire beneath the tread and extending laterally from shoulder to shoulder.

Glass fibers have likewise been suggested as a reinforcing component for pneumatic tires. See U.S. Pat. No. 2,184,326 assigned to the same company as the assignee of the subject application. The utilization of cords formed of assembled multiplicities of continuous glass filaments is illustrated in Marzocchi and Lachut U.S. Pat. No. 3,311,152 (assigned to Owens-Corning Fiberglas Corp.).

The organic materials as well as the earliest natural textiles used for reinforcement (cotton, for example) possess a variety of shortcomings. Cotton, for example, degrades when exposed to moisture and also experiences severe elongation. Rayon is low in modulus and, as well, possesses low strength per unit cross-sectional area. The polyamide fibers, of which Nylon is the principal example, are stronger as compared to rayon but also undergo considerable undesirable elongation and yield under load. Nylon, due to its thermal character, also is subject to "thumping" due to flat spots which form in cool weather. The organics, as reinforcement, are also undesirable since the uncontrollable elongation and yield problem causes tires produced by different manufactures in different molds and postcuring facilities to be of different overall dimension and different carcass strength.

The extremely desirable properties which a glass filament possesses, from the standpoint of a tire reinforcement, include (a) essentially 100% elasticity, (b) essentially no yield under stress, (c) excellent dimensional stability and (d) immunity to change by reason of varying atmospheric conditions. Properties, on the other hand, which demonstrate considerable variance with the conventional organics include (1) stiffness (glass is 322 grams per denier [gpd] while Nylon ranges from 18 to 23 gpd, the polyesters range from 11 to 21 gpd, the acrylics such as Acrilan and Orlon 7 to 10 gpd and viscose rayon 11 to 25 gpd); (2) a low breaking elongation (glass is 3–4% whereas the polyesters range from 19–30%, Nylon 16–40%, acrylics, e.g., Acrilan, 36–40% and viscose rayon 9–30%; (3) a relatively high specific gravity (glass is 2.54 compared to 1.14 for Nylon and the acrylics, 1.5 for rayon and 1.22 to 1.38 for the polyesters, e.g., KODEL and DACRON); and (4) toughness (on a denier basis, glass has a value of 0.07 compared to Nylon's 0.75, rayon's 0.20, 0.5 for DACRON polyester, 0.37 for KODEL polyester and 0.4 for the acrylic ORLON). From the above, it can be appreciated that the utilization of glass in any form, e.g., filament, strand or cord, as a reinforcement for rubber is not a matter of substitution but, to the contrary, entails a consideration of the overall properties and, as well, a determination of the ideal geometric location of the glass, alone and in combination with other materials, in order to achieve effective reinforcement.

It is an object of the present invention to provide a pneumatic tire employing a novel carcass reinforcement including a combination of extensible and inextensible subassemblies and, in combination, a specific novel arrangement of these subassemblies which combine to yield a tire uniquely prepared to meet service conditions of wear and general performance and specifically to meet stress conditions in a manner not possible heretofore.

It is a particular object of the present invention to provide a tire which contains reinforcement cord members which are specifically designed in accordance with the expected stress to be met by the tire under normal service conditions and particularly adverse service conditions.

It is additionally an object of the present invention to provide a tire featuring a plurality of reinforcement cord plies of varying extensibility.

It is still another object of the present invention to provide a tire construction featuring a glass reinforcement which is a combination of assembled, discontinuous, glass fiber filaments and, as well, a combination of continuous, glass filaments, combined in such a manner as to lend an extensibility not normally associated with glass while at the same time possessing a potentiality for attachment to the elastomeric component of the tire as to represent an improved construction.

It is likewise an object of the present invention to provide a method of producing a unique tire reinforcement featuring a plurality of independent components combined unitarily as to provide thereby a combination of properties not heretofore possible in a tire reinforcement.

It is still another object of the present invention to provide generally improved methods of producing continuous lengths of multi-element composite cord combinations usable as reinforcements of a wide variety of mechanical industrial rubber products and related goods.

It is a further object of the present invention to provide several particular tire constructions; that is, a radial construction and a belted construction as peculiarly adapted for utilization of novel reinforcement materials in accordance with the present invention.

The foregoing, as well as other objects of the present invention, will become apparent to those skilled in the art from the following detailed description taken in conjunction with the annexed sheets of drawings on which there are presented, for purposes of illustration only, several variant embodiments of the linear reinforcement constructions, the tire constructions and the processes in accordance with the present invention.

IN THE DRAWINGS:

FIG. 1 is a perspective view schematically illustrating a continuous system for producing a composite or combination cord reinforcement in accordance with the present invention;

FIG. 2 is a perspective view schematically illustrating an alternative feed arrangement which may be substituted into the system illustrated in FIG. 1, for the purpose of varying the makeup of one of the components of the combination cord construction;

FIG. 3 is a perspective view of another alternative feed arrangement which may be substituted into the system illustrated in FIG. 1;

FIG. 4 is a side elevation view of a segment of a reinforcement member at an intermediate stage of its processing in accordance with the system illustrated in FIG. 1;

FIG. 5 is a sectional view taken on the line 5—5 of FIG. 4;

FIG. 6 is a side elevation view of a segment of a reinforcement cord member at a later stage of its processing in accordance with the system of FIG. 1;

FIG. 7 is a sectional view taken on the line 7—7 of FIG. 6;

FIG. 8 is a perspective view of another alternative feed arrangement which may be substituted in the system illustrated in FIG. 1;

FIG. 9 is a side elevation view of an alternative feed and combining station which may be substituted in part into the system illustrated in FIG. 1;

FIG. 10 is a sectional view taken on the line 10—10 of FIG. 9;

FIG. 11 is a three-quarter perspective view illustrating a segment of a reinforcement cord in accordance with a particular embodiment of the present invention;

FIG. 12 is a perspective view of a segment of a composite cord produced in accordance with the present invention;

FIG. 13 is a three-quarter perspective view of a pneumatic tire, but with portions of the tread and side wall broken away in order to show the interior construction employing reinforcement members in accordance with the present invention;

FIG. 14 is a front elevation view of the tire of FIG. 13 with the segment of the tread and the four carcass plies sliced away by vertical section in order to show the angular relationship of the cords in the several plies;

FIG. 15 is a view similar to FIG. 14 illustrating an alternative arrangement of reinforcement members in accordance with the present invention;

FIG. 16 is a three-quarter perspective view of a tire having portions broken away for purposes of showing the particular carcass and belt reinforcement; and FIG. 17 is an elevation view facing the tread, but with portions of the tread and belt plies broken away to show the angular relationship of the cords in the belt plies.

The present invention envisions novel reinforcement members adapted for incorporation into industrial, e.g., mechanical, rubber goods; said reinforcement representing a combination of individual assemblies, each formed of a plurality of subassemblies of different materials. The combination, in terms of the finite properties and capabilities of the continuous yarn or cord product, possesses a capability of reinforcement which is improved and in many respects unique as compared to that previously known in the art.

The invention also envisions particular tire constructions featuring multi-element cords formed of different materials having specifically differing extensibilities, but one of which is substantially nonextensible, and the particular positioning of these reinforcements, as to best take advantage of their relative extensibility and to best take advantage of the variant properties, to most efficiently meet or accommodate the stress under load to be expected.

The present invention further envisions novel continuous processes of combining variant materials in a manner which is economical, practical and yieldable of reinforcement material in continuous package form as to permit ready utilization in commercial industrial rubber goods manufacture, e.g., tires, V-belts, conveyor belts, hoses, etc.

Referring now more specifically to the drawings, there is schematically disclosed in FIG. 1 an arrangement for producing a composite or combination cord reinforcement in accordance with the present invention. A driven spool 11 rotating clockwise, as provided by a drive motor (not shown) in box 13, pulls a laterally moving cord 15 through a series of stations originating with the supply spool 17 containing a continuous length of primary yarn. The primary yarn 19 passes upwardly through an eyelet 21 and passes, in succession, a series of stations terminating in the windup spool 11. In the first station, a conveyor belt 23 is contacted while on its upper course by the primary yarn 19. In its lower course, the conveyor belt 23 passes into contact with an adhesive or impregnant which is passed onto the primary yarn 19. At the second station, the yarn then passes through a cylindrical pirn or package 25 containing a continuous supply of a secondary yarn 27. The pirn is rotated in the manner shown and the yarn 27 is wrapped in spiral disposition about the primary yarn 19, as the latter moves laterally (see FIG. 4). This two-yarn assembly 29 then passes to the third station composed of the conveyor belt 31 where the two-yarn assembly is brought into contact with the belt while on its upper course. The conveyor bears a suitable adhesive or impregnant applied in the same manner as with conveyor 23. The adhesive-bearing two-ply yarn assembly then moves to the fourth station composed of a hollow package or pirn 33 containing a continuous supply of a tertiary yarn 35. The pirn 33 rotates axially in a direction opposite to the pirn 25 whereby the yarn 35 is assembled onto the two-ply assembly, as it passes through, in reverse spiral disposition as compared to the secondary yarn 27 to thereby yield a balanced construction as illustrated most clearly in FIG. 6.

The combination cord comprising the primary core 19 and the oppositely spiraled overwraps of the yarn 27 and 35 then pass to the fifth station into contact with the upper surface of conveyor 39 which bears an impregnant imparted thereto by roller 41 therebeneath which rotates in its lowest arc in a bath of impregnant contained in pan 43. The impregnated composite cord 15 then passes to the sixth station composed of a wiping die 45 through which the cord passes to effect removal of excess impregnant and compression of all of the components together to the ultimately desired dimension. The cord finally passes through station 7 composed of a hollow chamber 47 housing a suitable stimulus as to convert the coated composite cord 15 to the nontacky state, whereupon, as indicated, it is wound on the windup roller 11.

FIG. 2 illustrates an alternative feed station for supplying the core yarn; in this case, designated 19a. The supply yarn is stored on and proceeds from a spool 17a rotatably mounted on the inner surface 17b of an annular collar 17c which is controlled by suitable means (not shown) to rotate on its own axis in the direction indicated by the arrow 17d in order to impart a desired amount of twist to the core strand 19a. The spool 17a can also be rotated, by suitable cam means, if desired to furnish a primary cord or core yarn in untwisted condition. It will be appreciated that the absence or amount of twist and, as well, the selection of yarn can be preselected in combination with the choice of secondary yarn 27 and tertiary yarn 35 as well as the appropriate rotation of the packages on which mounted as to achieve a variety of ultimate cord constructions.

An alternative arrangement for the supply of the core yarn is illustrated schematically in FIG. 3. A bushing 50 issues a plurality of fine continuous threads of glass from the bottom thereof. These pass between spaced manifold tubes 51 and 51a having facing surfaces containing a plurality of orifices issuing intermittent jets of air which break up the fibers into lengths measuring anywhere from 1 to 8 inches in length. These fall by gravity unto a hollow collecting drum 55 having a foraminous surface. A vacuum is impressed thereon to cause the lengths to collect on this surface. The collecting drum rotates and the loose mat of short lengths is gathered together and drawn convergingly as at 57 through a forming die 59 which forms the short lengths into a staple fiber yarn 19b which can be directed through the system illustrated in FIG. 1 in place of the core yarn 19. A suitable binder size is applied to the collected strands via the nozzle 57a.

A still further embodiment of a system for producing composite yarns is illustrated in FIG. 8. The core yarn 19b proceeds horizontally through guide eyelet 21b and thence axially through the flared end of a hollow, cone-shaped member 60. The member 60 extends from the flared end to a restricted neck portion 60a which defines a cylindrical collar portion 60b containing a restrictive passageway. An inclined connected conduit 60c serves as a passageway for air to enter the interior of the hollow member near the restricted neck portion 60a. The air flows forwardly and downstream of the laterally moving yarn 19b. A supply spool 63 furnishes a freely drawable secondary yarn 27b which likewise passes through the eyelet 21b and enters in contiguous relationship with the first yarn 19b. Air introduced through the conduit 60c causes the secondary yarn 27b to be drawn at a somewhat faster rate than the rate of the draw of the yarn 19b. This is dependent upon the amount and velocity of air introduced through the conduit 60 c. The result of this feed arrangement is that the amount of secondary yarn 27b is overfed onto the prime or core yarn 19b. The resultant composite yarn or cord 65 is then compacted via a suitable wiping die (like the wiping die 45 in FIG. 1). It is usually preferable to apply an adhesive or impregnant to the initial yarn 19b in order that the secondary yarn 27b will adhere thereto as urged into contacting relationship by the jet of air in the combining member 60. The yarn 65 is combined with additional lengths of yarn by passage through a hollow pirn 25 and/or 33 as in the system shown in FIG. 1.

An alternative arrangement for feeding the secondary yarn onto the primary yarn is illustrated schematically in FIG. 9 which is a side elevation view. The primary yarn 70 is drawn from the supply spool 71 through an eyelet 72 and then horizontally through the axial center of a split ring collar member 75 which rotates in either direction as controlled by appropriate bearing means (not shown). The collar split as at 77 defines facing surfaces 78 and 79 terminating in a central hole 80a. Face 78 contains a vertically elongated bore 80 in which resides a peg 82 projecting outwardly almost to the opposed face 79 opposite face 78. The peg or stud can move radially with respect to the collar, particularly downwardly against opposed spring 84, which tends to maintain the peg in the upper region of the elongated bore 80 as viewed in FIG. 9. In operation, a continuous length of a secondary yarn 86 drawn from a supply spool 88 passes through an eyelet 90 and thence through the central hole 80a in the collar 80 which is in communication with the split 77. This secondary yarn is then passed between the opposed rollers 92 and 92a and passed on downstream. Rotation of the split collar 75 causes the secondary yarn to be picked up by the peg 82 forming a loop 95 therein which extends from the primary yarn 70 up over the peg and back down to the primary yarn (see FIG. 9). Continued rotation causes the loop 95 to become tighter and tighter, finally forcing the peg to move downwardly against the spring 84, allowing the loop to slip over the rounded end of the peg and through the space between the end of the peg and the opposed face 79 at the other end of the split ring. The free loop end is immediately compacted with the assembly by passing through the opposed rollers 92 and 92a. The bottommost roller 92a passes in contact with adhesive transfer roller 97 which rotates, at least in part, in a liquid bath of adhesive or impregnant. The process of combining the secondary yarn with the first yarn, as described, is frequently termed a "false twist" and is repeated again and again through continued cycles as described, creating a series of spaced gatherings of the secondary yarn on the first yarn. A plurality of these split rings can be employed to impart several depositions of false twist yarns as well as secondary and tertiary yarns of different compositions in place of or in combination with the rotating packages 25 and 33 in the composite yarn manufacturing system illustrated in FIG. 1.

A particular composite or cord construction 98 in accordance with the present invention is illustrated in FIG. 11. It is composed of a core 100 about which is wound, in spiral disposition, a secondary yarn 102. The primary core 100 is, in this embodiment, formed of a staple fiber yarn; the production of which was described in connection with FIG. 3. The spirally-wrapped secondary yarn 102 is composed of strand or multiplicity of strands, e.g., a yarn formed of continuous glass filaments. The staple fiber core includes a plurality of "ends" 104 which project outwardly from the composite cord assembly in between the secondary spiral wrap. The composite cord or yarn 99 is normally adapted for incorporation as a reinforcement in a variety of elastomeric vulcanized products.

The glass components of the composite cord 99 bear a "size" composition including an anchoring agent and, as well, the composite cord is desirably preferably inclusive of a surrounding impregnant containing an elastomeric constituent compatible with the ultimate rubber product. The plurality of ends 104 projecting from the cord provide increased securement to the ultimately surrounding elastomeric matrix in which the composite cord is embedded in the vulcanized rubber product since the opposite end is held tightly compacted with the contiguous strands by the spiral wrapped strand 102.

In FIG. 12, there is disclosed, greatly enlarged, a composite yarn as it might appear prior to winding on the windup roll 11. This composite yarn is identified by the reference numeral 15 and includes a core 19 which is the yarn formed of a plurality of individual organic subassemblies 106. Oppositely and spirally-wound yarns 27 and 35 are each composed of a plurality of continuous glass filaments. The yarn 27, for example, may be composed of 3–10 strands, in turn each composed of 100–500 individual continuous filaments. The composition of yarn 35 may be the same or different. Generally, in order to yield a balanced structure, the makeup of the yarn 27 and 35 is the same. In accordance with the preferred practice of the present invention, the core 19 is composed of organic strands, yarns or filaments. By organic, or course, is meant to include rayon (such as viscose rayon, cuprammonium rayon and rayon marketed under the trademark FORTISAN); Nylon (such as Nylon 66, both regular and high tenacity, and Nylon 6); the acrylic fibers (such as those marketed under the trade names ORLON, ACRILAN and ZEFRAN); the polyesters (including fibers sold under the trademarks DACRON, KODEL and others); the olefin type (such as polyethylene, polypropylene, ethylene propylene copolymer, etc.) and, as well, the more conventional cotton and acetate and, as well, combinations and blends of the foregoing. These organics are, in all cases, extensible, that is, are capable of elongating from 8–30 percent, depending on the particular fiber, before breaking.

In the composite yarn or cord reinforcements of the present invention, the "overfeed" yarn or the spirally-wound yarn is selected from relatively inextensible yarns of which glass fiber yarns having an extensibility or elongation of from 2–3½ percent are the most illustrative and, by reason of other properties mentioned hereinbefore, are the most preferred. A variety of composite yarns of various and an almost universal variety of strength properties is possible in accordance with the foregoing. Thus, it is possible to design a composite yarn which will elongate any desired amount at any preselected load, depending upon the choice of the organic. Furthermore, by the control of the degree of overfeed or character of spiral disposition of the continuous substantially inextensible yarns, it is possible to have the applied load or stress taken up by the glass at a predetermined elongation and, as indicated, at a predetermined load. It is, of course, even possible to have the core yarn made up of a combination of organic filaments, yarns or subassemblies. Each would contribute its own degree of resistance to elongation backed up by the ultimate overfeed of glass yarn. As can be appreciated, looking at FIG. 12, the organic components will elongate while gradually the glass yarns will assume a more linear or straight configuration as opposed to the spiral configuration illustrated in FIG. 12. When ultimately straight, it would be expected that the glass would be bearing the load while the organic would no longer be contributing to the support; or it may have already failed precisely at the moment that the glass had assumed the load. The glass filaments which may be used may vary in diameter from a diameter of 0.00060 to a diameter down to 0.00008 inches. In certain applications, fibers smaller than 0.00036 are preferred and, in some applications, the extremely fine diameter fibers having an average diameter of about 0.00014 and representing a range of from about 0.00018 inches down to about 0.00008 inches are very desirable. It may be here mentioned, with reference to these extremely fine diameter fibers, that FIG. 12 does not truly represent a comparative sizing of the glass and the organic components unless the yarns 27 and 35 are taken as representative of a large plurality of individual filaments. By way of example, a glass filament having a diameter of 0.00014 on an average would have a cross-sectional area which would be only about one-ninth that of the conventional Nylon, polyester or viscose rayon filament.

It is found that these extremely small diameter glass filament fibers readily intertwist with the other organic filaments without breaking, thus displaying very good processibility and blendability. It will be appreciated that, by proper selection of length and composition of the organic, the composite cord or bundle can be engineered to endure a load just approaching the yield point exhibited by the composite cord when the organic filament is elongated to its yield point and the glass fibers or yarns are elongated the 2 to 3 percent which they are capable of and just below the yield point thereof. The combination yarn will thus break at a load that is approximately the same as the combined breaking strength of the glass and the organic elements. By a carefully selected overfeed of the glass components relative to the organic components, the organic can be made to yield, fully break or stretch only a limited amount before the glass elements take over. This is of considerable importance in reinforcement of rubber products such as tires inasmuch as it has been observed that the reinforcement plies in a tire (see FIG. 13) are subjected to different stresses. Thus, when a tire is subjected to a given impact as, for example, rolling over a stone or a curb, the cords of which the most radially outermost ply is formed will be subjected to the greatest deflection, while the next innermost ply and so on will be subjected to less deflection. Accordingly, in accordance with the present invention, it is envisioned that the plies and/or the particular regions of a tire or other vulcanized rubber product subjected to the greatest amount of deflection under load conditions will be reinforced with a reinforcement cord member in accordance with the present invention so designed as to embody the appropriate amount of deflection or extensibility capabilities. Thus, it may be appreciated that a composite cord can be provided which will endure a considerable elongation, taking advantage of the elongation capabilities of the organic component. By the appropriate spiral overfeed of the glass thereupon, the glass under normal and routine usage will experience no wear at all. On the other hand, it can be so engineered that at a given deflection, by reason of the appropriate spiral disposition and degree of overfeed of the glass components, when subjected to such phenomena, impact or deflection, the glass will become straightened out and as cushioned by the organic, either broken or elongated, assume the load, thus lending ultimately superior reinforcement at the appropriate time that it is needed.

In FIG. 13, there is disclosed a tire 120 of the present invention composed of annular spaced bead rings 122 and 124 composed of bead wires 125. The tire is a conventional four-ply bias tire and includes an innermost bias ply 126, a second ply 128, a third ply 130 and a fourth outermost ply 132. The carcass plies extend, as indicated, from bead to bead with reverse end turnup as shown in dotted outline. Carried at the crown portion of the carcass is a tread 133. The side wall is identified by the reference numeral 134. The individual cords in the adjacent plies extend in opposite directions as best shown in FIG. 14. In accordance with the present invention, the cords in bias ply 132 are formed of a composite or combination cord or yarn including extensible, usually organic, components and substantially inextensible, usually glass, components. The composite cord making up the outermost ply 132 is designed by the proper combination of organic and appropriate disposition or overfeed of the glass as to yield a composite cord having the greatest amount of deflection capabilities or elongation capabilities as compared to the cords in ply 130 and, successively inwardly, the cords in ply 128 and the cords in ply 126. In a tire of such construction, the glass component in each ply will come into play at a predetermined elongation of the organic component whereby the plies in aggregate will act more as a unit during load, thereby exhibiting more equal distribution of the load over all the plies.

In FIG. 16, there is disclosed a radial tire construction 140 of the present invention composed of spaced bead portions 142 and 144 containing, respectively interiorly thereof, annular bead rings 145 and 145'. The side wall carcass of this radial tire is composed of a radial ply 147; the individual cords of which proceed directly from bead to bead (as opposed to a bias construction) in perpendicular disposition to the peripheral centerline 148 of the tire. An inner cushion liner 150 extends from bead to bead underneath the radial ply 147. The tire includes a tread 151. Between the tread and the radial carcass ply 147 are situated a pair of belt plies 155 and 157; the individual cords of each of which extend on a bias, the cords in the plies 155 and 157 being oppositely inclined. This is best shown in FIG. 17. In accordance with the present invention, the belt plies are formed of different composite cords; that is, having different extension capabilities. Similarly, the cords of the radial ply are composed of a composite or combination cord having a differing extensibility and load characteristics as opposed to the belt plies 155 and 157.

A particularly desirable tire construction is illustrated in FIG. 15 identified by the reference numeral 160. This tire is composed of two carcass plies 162 and 164 which extend from bead to bead in the manner described in the tire of FIG. 13. The tire includes a ground contacting tread 166 having a peripheral centerline groove 168. Additional reinforcement for the tire is provided by belt plies 170 and 172. In accordance with the present invention, the carcass plies 162 and 164 are formed of mutually parallel cords which are combination cords as described herein. Similarly, the belt plies 170 and 172 are each formed of mutually parallel composite cords as described. The composite cords in the carcass bias plies 162 and 164 are oppositely inclined at an angle of 29°–38° with the peripheral centerline 168. The cords of the respective belt plies 170 and 172 are also oppositely inclined at an angle of from 22°–30° with the peripheral centerline of the tire. The outermost ply 172 is composed of composite cords of greater extensibility than the ply 170. Likewise, bias carcass ply 162 is composed of composite cords of greater extensibility than the cords in ply 164.

In order that the advantages of the present invention may be realized to the fullest, it is desirable that the glass filament component of the composite yarn cords be first treated to provide protection against interfilament deterioration by reason of contact between adjacent filaments. Additionally, the glass strands and yarns are most desirably impregnated with an elastomeric impregnant. The surface treatment of the glass filament is accomplished at the forming stage of the filament; that is, as the filament is drawn from the bushing to be formed into a multi-filament strand. A suitable treatment involves spraying the filament with a liquid containing an amino silane having a carboxyl group in the organic group attached to the silicon atom or an amino or carboxyl group in the carboxylato group of a Werner Complex compound. Suitable formulations and techniques are disclosed in application Ser. No. 406,501, filed Oct. 26, 1964, entitled "Glass Fibers Treated For Combination With Elastomeric Materials and Method" and assigned to the same assignee of the present application. A typical size composition is composed of 0.5–2.0 percent by weight gamma-aminopropyltriethoxy silane, 0.3–0.6 percent by weight of a lubricant and the remainder water.

Impregnation of a strand or a yarn composed of glass fibers is accomplished by passing the continuous strand or yarn through a bath of a suitable elastomeric impregnant. A suitable impregnant is composed of 60–40 parts by weight of a 38% dispersed solids system including a butadiene-styrene-vinyl pyridine terpolymer latex, a butadiene styrene latex and a resorcinolformaldehyde resin dispersed in 39 parts by weight of water. One such product is marketed by Uniroyal (formerly U.S. Rubber Company) under the trade name LOTOL 5440.

It is, of course, frequently desirable to apply the impregnant to the composite cord itself rather than to the subassembly composed exclusively of the gathered-together multiplicity of continuous glass filaments. As a matter of fact, in accordance with a preferred embodiment, the application of the impregnant is accomplished intermittently in a series of stations constituting the formation of the composite yarn or cord assembly. This is illustrated in FIG. 1 wherein the primary yarn is brought into contact with the conveyor belt 23, the secondary combination is brought into contact with the conveyor 31 and the ultimate composite yarn is further contacted with impregnant at the conveyor 39. This sequential application of impregnant provides a very desirable distribution of elastomeric impregnant throughout the composite cord assembly from the viewpoint of the interior composition of the ultimate combination cord.

The practice of the present invention envisions reinforced rubber products containing, as reinforcement, composite cords of an almost universal range of extensibilities. A composite yarn having an extensibility of 10 percent can be prepared by combination of Nylon filaments having about 20 percent stretch per se and glass filaments having about 3 percent stretch per se. Proper control of the amount of overfeed of the glass in the method as described will yield a composite yarn having the 10 percent extensibility. Combinations of polyester and glass with appropriate control of overfeed yield a composite yarn or cord of yet different properties, depending upon the amount of overfeed. Combination yarns and cords are producible representing a combination of three different fibers, e.g., a polyamide (Nylon), a polyester (Dacron) and fiber glass.

Tires in which the various plies include cords of variable extensibility in the manner as described herein are capable of functioning in a more readily forecastable manner by reason of the preferred constructions. Thus, the various plies can coact with adjacent plies in a manner not possible heretofore. To the present time, the various plies in the overall tire were possessed of the same extensibility since they were, in fact, formed of the same identical cord.

Tires featuring plies composed of cords in accordance with the present invention can be fabricated of less bulk by reason of the aggregate coaction achievable due to the variable extensibility cords. As a consequence, the sheer bulk of the carcass need not be as great as in conventional tires employing straight rayon, straight Nylon or straight polyester cords. As a consequence, the heat buildup is not as severe and failure due to heat deterioration of organic cords is substantially if not completely avoided.

It is within the purview of the present invention to form combination or composite cord constructions in the manner described, but featuring the substitution of small diameter stainless steel fibers for the organic subassemblies hereinbefore discussed. The Brunswick Corporation markets a range of small diameter continuous stainless steel fibers ranging in diameter from 0.0010 to 0.00010 inches. Composite cords featuring this combination, and, as well, tertiary combinations including fiber glass, stainless steel and organics, represent a blend possessed of a wide range of desirable properties suitable for rubber reinforcement, as well as in the manufacture of various fillers for gases and liquids.

The present invention likewise envisions the employment of the combination cords as disclosed herein in chopped form as additions to rubber stock to form admix stocks of various properties depending upon the degree of orientation of the chopped lengths and depending upon the amount of mixing employed in combining the chopped lengths into the elastomeric stock. Extended mixing will cause the cords to filamentize into filaments, thus losing the bundle integrity in which introduced. Admix stock containing both fibers and integral composite cords is a preferred form of admix stock in accordance with the present invention.

All obvious substitutions and modifications in materials, compositions, sequence of steps and rearrangement of apparatus are intended to be included within the scope of the present invention unless clearly violative of the language of the appended claims.

I claim:

1. A composite cord construction comprising a substantially or essentially continuous core yarn and a continuous wrap of a second yarn, said second yarn being longer per unit length of said core yarn, said excess length of second yarn being present along said core yarn in spaced islands or regions along the length of said core yarn, said islands each comprising a given length of said second yarn in the form of a loop, initially starting at the core yarn, proceeding laterally outwardly to a midpoint and thence back to the core yarn, which described loop is wrapped about said core yarn so that the length of yarn in one-half of said loop proceeds in one spiral direction about said core yarn and the length of said yarn in the other half of said loop proceeds in the opposite spiral direction, and means for securing said second yarn about said core yarn.

2. The composite cord construction as claimed in claim 1, wherein one of said core yarn and continuous wrap is formed of an assembled plurality of glass filaments.

3. The composite cord construction as claimed in claim 2, wherein the continuous wrap of second yarn is formed of an assembled plurality of glass filaments.

4. The composite cord construction as claimed in claim 1, wherein said means comprises an adhesive.

5. The composite cord construction as claimed in claim 1, wherein said means comprises an impregnant.

6. The composite cord construction as claimed in claim 5, wherein said impregnant is an elastomeric impregnant.

7. The reinforcement cord as claimed in claim 6, wherein said impregnant is vulcanizable.

8. The composite cord construction as claimed in claim 1, wherein said core is composed of a plurality of gathered stainless steel fibers ranging in diameter from 0.0010 to 0.00010 inches and said second yarn is formed of an assembled plurality of glass filaments.

9. The composite cord construction as claimed in claim 8 which includes a third yarn formed of organic material, said third yarn being disposed similarly to said second yarn.

10. The composite cord as claimed in claim 7 wherein said second yarn is formed of an assembled plurality of glass filaments.

* * * * *